(12) United States Patent
Luo et al.

(10) Patent No.: US 10,237,194 B2
(45) Date of Patent: Mar. 19, 2019

(54) MAXIMIZE NETWORK CAPACITY POLICY WITH HEAVY-TAILED TRAFFIC

(71) Applicant: Futurewei Technologies, Inc., Plano, TX (US)

(72) Inventors: Min Luo, Cumming, GA (US); Shih-Chun Lin, Alpharetta, GA (US); Ian F. Akyildiz, Alpharetta, GA (US)

(73) Assignee: Futurewei Technologies, Inc., Plano, TX (US)

( * ) Notice: Subject to any disclaimer, the term of this patent is extended or adjusted under 35 U.S.C. 154(b) by 293 days.

(21) Appl. No.: 14/989,170

(22) Filed: Jan. 6, 2016

(65) Prior Publication Data
US 2017/0195238 A1 Jul. 6, 2017

(51) Int. Cl.
*H04L 12/28* (2006.01)
*H04L 12/851* (2013.01)
*H04L 12/26* (2006.01)
*H04L 12/875* (2013.01)

(52) U.S. Cl.
CPC ...... *H04L 47/2441* (2013.01); *H04L 43/0852* (2013.01); *H04L 47/56* (2013.01)

(58) Field of Classification Search
None
See application file for complete search history.

(56) References Cited

U.S. PATENT DOCUMENTS

| 6,801,502 B1* | 10/2004 | Rexford | H04L 45/00 370/235 |
| 7,636,321 B1* | 12/2009 | Iannaccone | H04L 43/0864 370/252 |
| 2003/0021295 A1* | 1/2003 | Sahinoglu | H04Q 11/0478 370/468 |
| 2003/0031193 A1* | 2/2003 | Andrews | H04L 47/14 370/412 |
| 2004/0114519 A1* | 6/2004 | MacIsaac | H04L 43/00 370/232 |
| 2016/0142333 A1* | 5/2016 | Panchagnula | H04L 47/6295 370/412 |
| 2016/0234333 A1* | 8/2016 | Yeh | H04L 45/586 |

OTHER PUBLICATIONS

Lee, I.W.C., et al., "Estimating Heavy-tails in Long-range Dependent Wireless Traffic," 2005 IEEE, 5 pgs.
Dekkers, A.L.M., et al., "A Moment Estimator for the Index of an Extreme-Value Distribution," Institute of Mathematical Statistics is collaborating with JSTOR to digitize, preserve, and extend access to the Annals of Statistics, vol. 17, No. 4, www.jstor.org, Sep. 1988, pp. 1833-1855.

* cited by examiner

*Primary Examiner* — Alex Skripnikov
*Assistant Examiner* — Lionel Preval
(74) *Attorney, Agent, or Firm* — Conley Rose, P.C.

(57) ABSTRACT

A network element (NE) comprising a receiver configured to receive packets from a plurality of flows, and a processor coupled to the receiver and configured to perform classification on the plurality of flows according to arrivals of the packets to classify the plurality of flows into a heavy-tailed (HT) class and a light-tailed (LT) class assign scheduling weights to the plurality of flows according to the classification, and select a scheduling policy to forward the packets of the plurality of flows according to the scheduling weights.

19 Claims, 8 Drawing Sheets

MAXIMIZE NETWORK CAPACITY POLICY WITH HEAVY-TAILED TRAFFIC

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication networks support highly heterogeneous traffic, which may include movie downloading, messaging, file transfer, web traffic, and interactive traffic. Different types of traffic may have different traffic patterns and different requirements and constraints on network resources. A scheduler is commonly employed to schedule multiple flows for transmission over a specific transmission bandwidth. Network performance relies heavily on the performance of the scheduler.

SUMMARY

In one embodiment, the disclosure includes a network element (NE) comprising a receiver configured to receive packets from a plurality of flows, and a processor coupled to the receiver and configured to perform classification on the plurality of flows according to arrivals of the packets to classify the plurality of flows into a heavy-tailed (HT) class and a light-tailed (LT) class, assign scheduling weights to the plurality of flows according to the classification, and select a scheduling policy to forward the packets of the plurality of flows according to the scheduling weights. In some embodiments, the disclosure also includes the NE further comprising a memory coupled to the receiver and the processor, wherein the memory is configured to store a plurality of queues, wherein each queue is configured to hold packets of a particular flow, and wherein the processor is further configured to assign the scheduling weights to the plurality of flows by determining a head-of-line (HoL) delay for a first of the plurality of queues corresponding to a first of the plurality of flows, wherein the HoL delay is a time duration between an arrival time and a transmission time of a first of the packets in the first queue, determining a power factor for the first flow according to the classification, and setting a first of the scheduling weights of the first flow to a value of the HoL delay raised to an order of the power factor, and/or to perform classification on the plurality of flows by determining a tail distribution coefficient for the first flow according to packet inter-arrival times of the first flow, and classifying the first flow into the HT class and the LT class according to the tail distribution coefficient, and/or to determine the power factor for the first flow by setting the power factor to a value of one less than the tail distribution coefficient when the flow is in the HT traffic class, and setting the power factor to a constant value greater than two when the flow is the LT traffic class, and/or to determine the tail distribution coefficient for the first flow by performing a discrete wavelet transform on the packet inter-arrival times of the first flow to produce discrete wavelet coefficients, and applying an extreme value theory to the discrete wavelet coefficients to produce the tail distribution coefficient, and/or to select the scheduling policy from a plurality of candidate scheduling policies to serve a first of the flows comprising a maximum scheduling weight, and/or to collect flow statistics for the plurality of flows. In some embodiments, the NE is an edge node of a local network, wherein the plurality of flows is received from a remote network, wherein the NE further comprises a transmitter coupled to the processor and configured to send the traffic information associated with the plurality of flows to a local NE of the local network, and wherein the traffic information comprises the classification of the plurality of flows.

In another embodiment, the disclosure includes a method implemented by an NE in a local network, comprising receiving, via a receiver of the NE, packets from a plurality of flows, obtaining traffic information associated with the plurality of flows, wherein the traffic information comprises classification of the plurality of flows, and wherein the classification comprises an HT traffic class and an LT traffic class, assigning, via a processor of the NE, scheduling weights to the plurality of flows according to the traffic information, and selecting, via the processor, a scheduling policy from a plurality of candidate scheduling policies for forwarding the packets of the plurality of flows according to the scheduling weights. In some embodiments, the traffic information further comprises power factors for scheduling the plurality of flows, wherein the power factors are dependent on the classification, and wherein the method further comprises queueing the packets received from each flow in a separate queue, and measuring HoL delays of the queues, wherein assigning the scheduling weights to the plurality of flows comprises setting the scheduling weight of each flow to a value of a corresponding queue HoL delay raised to an order of a corresponding power factor, and/or assigning the scheduling weights according to the traffic information to the plurality of flows is based on the plurality of candidate scheduling policies, and wherein the selection of the scheduling policy comprises comparing a sum of the scheduling weights, and/or the scheduling policy is selected for a current transmission time slot, and wherein the method further comprises employing the scheduling policy for a period of time subsequent to the current transmission time slot, wherein the period of time is a range between 5 transmission time slots to 100 transmission time slots, and repeating the measuring of the HoL delays and the selecting of the scheduling policy at an end of the period of time, and/or obtaining the traffic information comprises computing, via the processor, the power factors for the plurality of flows, wherein the plurality of flows include a flow of the HT traffic class and a flow of the LT traffic class and wherein a power factor of the flow of the HT traffic class is greater than a power factor of the flow of the LT traffic class, and/or computing, via the processor, the tail distribution coefficient for the arrival process by performing a discrete wavelet transform on the arrival process to produce discrete wavelet coefficients, and applying an extreme value theory to the discrete wavelet coefficients to estimate the tail distribution coefficient. In some embodiments, the plurality of flows are received from a remote network, and wherein the method further comprises sending, via a transmitter of the NE, the traffic information to a local NE of the local network, and/or further obtaining the traffic information by receiving, via the receiver, the traffic information from a local NE of the local network.

In yet another embodiment, the disclosure includes an NE comprising a receiver configured to receive a plurality of flows and traffic information associated with tail distributions of packet inter-arrival times of the plurality of flows, a processor coupled to the receiver and configured to determine delays associated with the plurality of flows, and determine scheduling priorities for the plurality of flows according to the traffic information and the delays, and a transmitter coupled to the processor and configured to forward the plurality of flows according to the scheduling priorities. In some embodiments, the disclosure also includes the NE further comprising a memory coupled to the receiver and the processor, wherein the memory is configured to store a plurality of queues, each configured to hold packets of a particular flow, and wherein the processor is further configured to determine the delays associated with the flows by measuring HoL delays of corresponding queues. In some embodiments, the traffic information comprises scheduling power factors for the plurality of flows, wherein scheduling power factors of flows of LT distributions are greater than scheduling power factors of flows with HT distributions, and wherein the processor is further configured to determine the scheduling priorities by setting the scheduling priority of each flow to a value of a corresponding queue HoL delay raised to an order of a corresponding power factor, and/or to select a scheduling policy from a plurality of candidate scheduling policies to schedule a first of the flows comprising a highest scheduling priority.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Network traffic may include a combination of HT flows and LT flows. HT refers to a process with a tail distribution that decays slower than an exponential distribution. An HT flow carries a large volume of traffic, but the traffic occurs infrequently. Thus, HT traffic may comprise characteristics of a long-range dependent (LRD) process. For example, a user may generate occasional file or movie download requests with large file sizes. Conversely, LT refers to a process with a tail distribution that decays faster than or equal to an exponential distribution. An LT flow carries a small volume of traffic, but the traffic occurs frequently. For example, a user may send frequent messages and emails that carry a small amount of data. A maximum-weight scheduling (MWS) algorithm, which focuses on queue backlogs, may be employed for scheduling. In MWS, a queue with a maximum queue length or a maximum number of enqueued packets receives a highest service priority. MWS may perform well when all flows are LT flows. However, when a network carries both LT and HT flows, the LT flows are less likely to be served when compared to the HT flows since the queues of the LT flows may be filled at a slower rate than the queues of the HT flows. Therefore, when employing MWS in a hybrid HIT/LT network, the average delay for LT traffic becomes unbounded.

Disclosed herein are embodiments of an adaptive traffic-aware DMPWS scheme that provides optimal throughput for both HT traffic and LT traffic in a hybrid HT/LT network. In the DMPWS scheme, flows are classified into HT flows and LT flows and an optimal scheduling policy is selected based on scheduling weights that are dependent on the classification and HoL delays of the flows. In the disclosed embodiments, the packets of each flow are queued in a dedicated queue, and the HoL delay of a flow refers to the amount of time between the arrival time of a packet at a network node and the time when the network node transmits the first bit of the packet on a line. The disclosed embodiments employ power-weight delays as scheduling weights. The power-weight delay of a flow is defined as the HoL delay of a corresponding queue raised to an order or a power factor dependent on the traffic class of the flow. For example, in order to prevent LT flows from being served or scheduled in the presence of other HT flows, the LT flow is assigned with a greater power factor than the HT flows. In an embodiment, the edge nodes of a network perform traffic classification on exogenous flows and forward the traffic classification information to the interior nodes of the network. All edge nodes and interior nodes perform scheduling according to the traffic classification information and local HoL delays. In an embodiment, traffic classification is performed by employing discrete wavelet transform and extreme value theory.

The disclosed embodiments are suitable for large-scale networks, Internet protocol (IP) networks, packet-switched networks, and centrally controlled software-defined networks (SDN). The disclosed embodiments may be employed in conjunction with any types of routing algorithms. By employing the same power-weight delay scheduling mechanisms at every node in a network, the disclosed embodiments provide a stable network with optimal end-to-end (E2E) throughput and minimum average packet delays under any network topologies and traffic scenarios. In addition, since the scheduling weights are determined based on traffic classes and HoL delays, the HoL delay measurements, the traffic classification, and the selection of the optimal scheduling policy may be adjusted infrequently to reduce signaling overheads.

Figure 1:
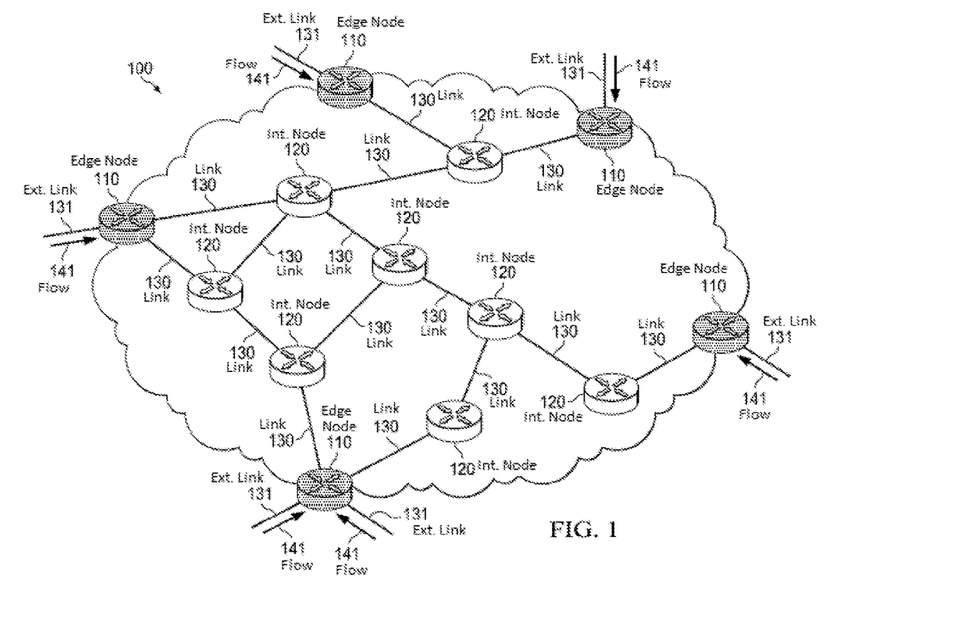
FIG. 1 is a schematic diagram of an embodiment of a network that implements delay-based maximum power-weight scheduling (DMPWS).

FIG. 1 is a schematic diagram of an embodiment of a network 100 that implements DMPWS. The network 100 comprises a plurality of edge nodes 110 and a plurality of interior nodes 120 interconnected by a plurality of links 130. The edge nodes 110 are located at the edges or boundaries of the network 100. The edge nodes 110 are further interconnected with some other remote networks via a plurality of external links 131. The interior nodes 120 are located within the network 100. The network 100 may be any types of network, such as an electrical network and/or an optical network. The network 100 may operate under a single network administrative domain or multiple network administrative domains. The network 100 may employ any network communication protocols, such as transmission control protocol/Internet protocol (TCP/IP). The network 100 may further employ any types of network virtualization and/or network overlay technologies, such as software-defined network (SDN) technologies and virtual extensible local area network (VXLAN) technologies. The network 100 may interconnect with other networks. The links 130 and 131 may comprise physical links, such as fiber optic links, electrical links, wireless links, and/or logical links used to transport data in the network 100.

The edge nodes 110 may be any network devices, such as routers and switches, configured to forward data in the network 100 and communicate with NEs of other networks. As shown, the edge nodes 110 may receive flows 141 from other networks. The flows 141 may be referred to as external flows or exogenous flows. Some of the flows 141 may carry HT traffic, while some other flows 141 may carry LT traffic. The edge nodes 110 classify the flows 141 entering the network 100 into HT flows and LT flows and schedule the flows 141 for transmission in the network 100 according to the classification. In an embodiment, the edge nodes 110 employ wavelet analysis to classify the flows 141 and to compute tail distribution coefficients for the flows 141, as described more fully below. In order to provide about equal services to both HT and LT traffic, the edge nodes 110 assign higher weighting factors to the flows 141 with LT traffic than the flows 141 with HT traffic. The edge nodes 110 estimate delays associated with the flows 141 and compute weighting factors according to the estimated delays and the classification of the flows 141. For example, the edge nodes 110 enqueue packets of each flow 141 in a separate queue and measure the HoL delay of each queue. The weighting factor of a flow 141 is computed by raising the HoL delay of the queue to an order of a power factor that is dependent on the classification. The weighting factor is also referred to as a power-weight delay. The edge nodes 110 serve the queue with the maximum power-weight delay. The weighting factor computation and the scheduling mechanisms are described more fully below. The employment of the power-weight delay enables LT traffic to receive higher scheduling opportunities, and thus may provide lower average delays for all LT traffic. The edge nodes 110 may send traffic information associated with the flows 141, such as the classification information and any other statistical information, to all interior nodes 120 to enable the interior nodes 120 to employ the same scheduling mechanisms.

The interior nodes 120 may be any network devices, such as routers and switches, configured to forward data within the network 100. The interior nodes 120 receive traffic information and employ the same scheduling mechanisms as the edge nodes 110. For example, the interior nodes 120 estimate HoL delays of local queues that are configured to store packets from the flows 141 for transmission and assign service priorities to the flows 141 according to the local HoL delays and traffic classification information. In some embodiments, the edge nodes 110 may send all traffic information to a controller, such as an SDN controller, and the controller may distribute the traffic information to the interior nodes 120. The edge nodes 110 and the interior nodes 120 may further collect other statistics associated with the flows 141 and exchange delays and any other information with neighboring nodes 110 and/or 120 to facilitate data forwarding in the network 100.

Figure 2:
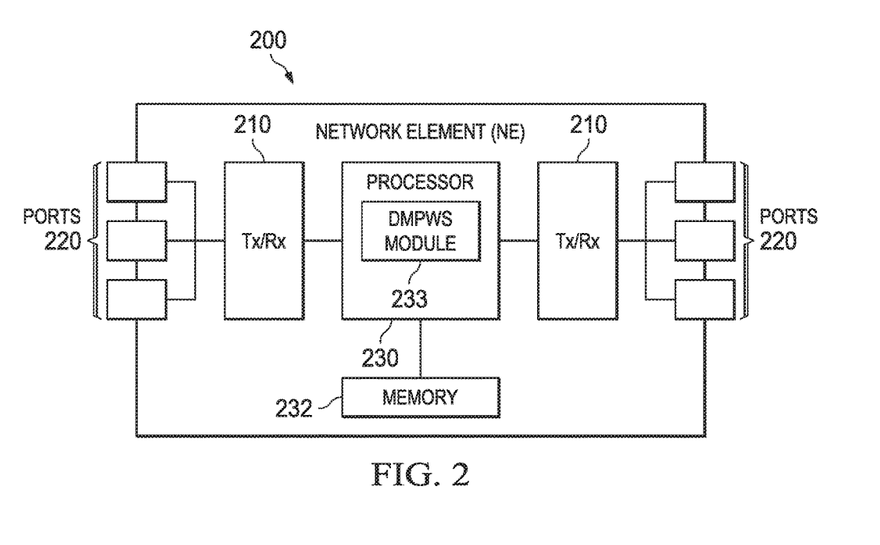
FIG. 2 is a schematic diagram of an embodiment of an NE.

FIG. 2 is a schematic diagram of an embodiment of an NE 200, such as the edge nodes 110 and the interior nodes 120 in the network 100. NE 200 may be configured to implement and/or support the DMPWS mechanisms and schemes described herein. NE 200 may be implemented in a single node or the functionality of NE 200 may be implemented in a plurality of nodes. One skilled in the art will recognize that the term NE encompasses a broad range of devices of which NE 200 is merely an example. NE 200 is included for purposes of clarity of discussion, but is in no way meant to limit the application of the present disclosure to a particular NE embodiment or class of NE embodiments.

At least some of the features/methods described in the disclosure are implemented in a network apparatus or component such as an NE 200. For instance, the features/methods in the disclosure may be implemented using hardware, firmware, and/or software installed to run on hardware. The NE 200 is any device that transports packets through a network, e.g., a switch, router, bridge, server, a client, etc. As shown in FIG. 2, the NE 200 comprises transceivers (Tx/Rx) 210, which may be transmitters, receivers, or combinations thereof. The Tx/Rx 210 is coupled to a plurality of ports 220 for transmitting and/or receiving frames from other nodes.

A processor 230 is coupled to each Tx/Rx 210 to process the frames and/or determine which nodes to send the frames to. The processor 230 may comprise one or more multi-core processors and/or memory devices 232, which may function as data stores, buffers, etc. The processor 230 may be implemented as a general processor or may be part of one or more application specific integrated circuits (ASICs) and/or digital signal processors (DSPs). The processor 230 may comprise a DMPWS module 233, which may perform traffic classification, compute power-weight delays, and scheduling depending on the embodiments and may implement methods 400, as discussed more fully below, and/or any other flowcharts, schemes, and methods discussed herein. As such, the inclusion of the DMPWS module 233 and associated methods and systems provide improvements to the functionality of the NE 200. Further, the DMPWS module 233 effects a transformation of a particular article (e.g., the network) to a different state. In an alternative embodiment, the DMPWS module 233 may be implemented as instructions stored in the memory devices 232, which may be executed by the processor 230. The memory device 232 may comprise a cache for temporarily storing content. e.g., a random-access memory (RAM). Additionally, the memory device 232 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof. The memory device 232 may be configured to store one or more packet queues.

It is understood that by programming and/or loading executable instructions onto the NE 200, at least one of the processor 230 and/or memory device 232 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable and that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions (e.g. a computer program product stored in a non-transitory medium/memory) may be viewed as a particular machine or apparatus.

Figure 3:
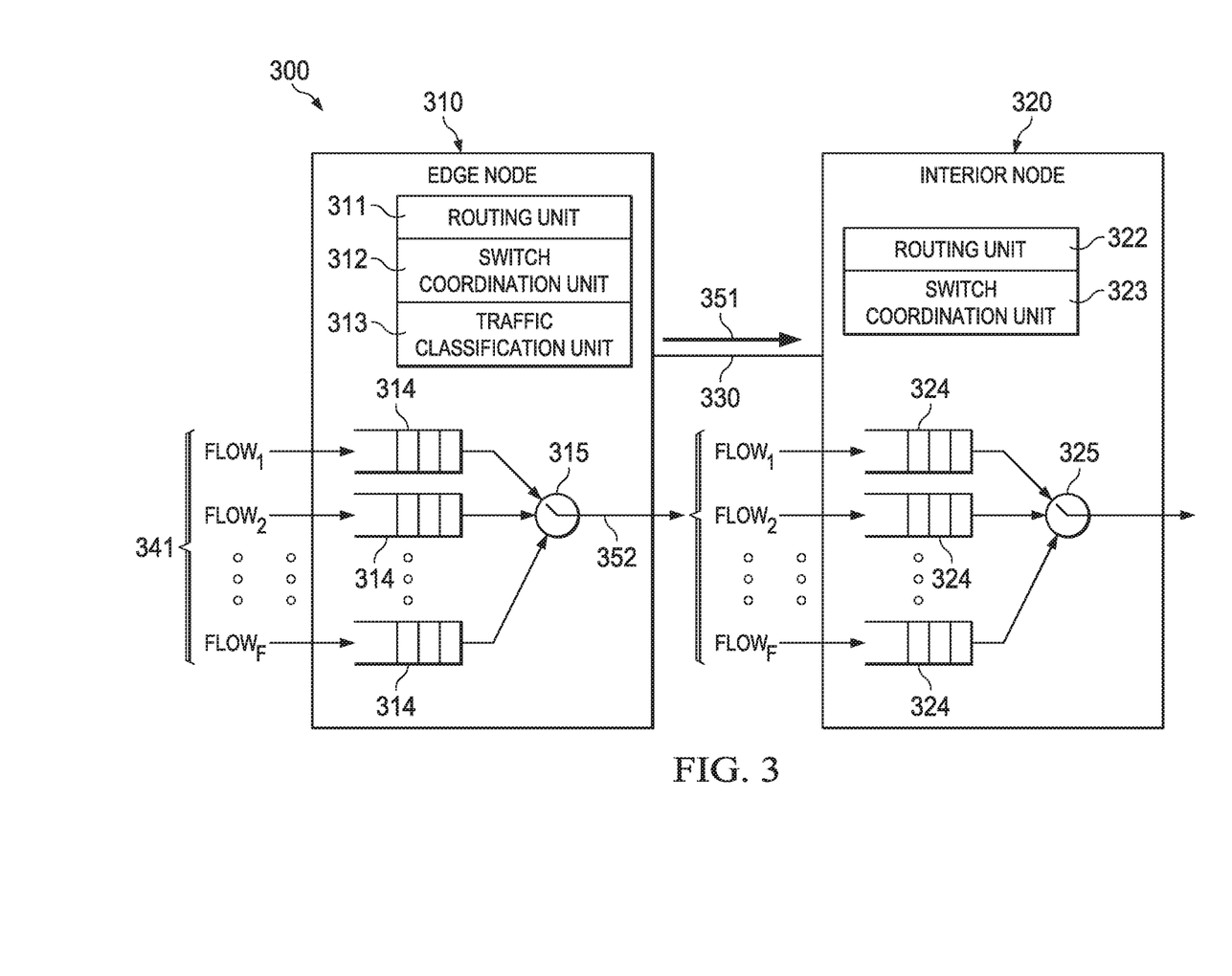
FIG. 3 is a schematic diagram of another embodiment of a network that implements DMPWS.

FIG. 3 is a schematic diagram of another embodiment of a network 300 that implements DMPWS. The network 300 comprises an edge node 310 similar to the edge nodes 110 and an interior node 320 similar to the interior nodes 120 interconnected by a link 330 similar to the link 130s. The network 300 is similar to the network 100, but provides a more detailed view of the DMPWS components in the edge node 310 and interior node 320. The edge node 310 comprises a traffic classification unit 313, a switch coordination unit 312, a routing unit 311, and a plurality of queues 314. The interior node 320 comprises a switch coordination unit 323, a routing unit 322, and a plurality of queues 324.

The traffic classification unit 313 may be a software component and/or hardware configured to classify flows 341 similar to the flows 141 entering the network 300 into HT flows and LT flows, collect statistics associated with the flows 341, and distribute the traffic classification information and flow statics to other nodes such as the interior node 310 in the network 300. The flows 341 are shown as Flow$_1$, Flow$_2$ . . . , Flow$_F$, where F is a total number of flows 341 received by the edge node 310. Some flows 341 may carry HT traffic, while other flows 341 may carry LT traffic. As shown, each queue 314 is configured to hold packets for a particular flow 341. To classify the flows 341, the traffic classification unit 313 monitors the packet inter-arrival times of the flows 341 and estimates a tail distribution coefficient of the inter-arrival times for each flow 341. The tail distribution coefficient may also be referred to as a tail coefficient. An inter-arrival time refers to the time duration between the arrival times of two consecutive packets from a flow 341. For example, when packets from a flow 341 arrive at times $t_1, t_2, \ldots t_j$, where j is any positive integer, the inter-arrival times, denoted as $\tau_j$, is computed as $\tau_j = t_j - t_{j-1}$.

The tail coefficient of a flow 341 may be estimated based on the arrival process of the flow 341, where the arrival process is formed by the packet inter-arrival time of the flow 341. The arrival process of a flow 341 may represented by $A_f(t) = \{\tau_1, \tau_2, \ldots, \tau_j\}$. The arrival processes of the flows 341. $A_f(t)$ for $1 \leq f \leq F$, are assumed to be independent and identically distributed over time. The tail coefficient of an arrival process $A_f(t)$ is defined as the least upper bound in a set of values k such that the expected value of $A_f^k(t)$ is less than or equal to infinity. The tail coefficient of $A_f(t)$, denoted as $\kappa(A_f(t))$, is as follows:

$$\kappa(A_f(t)) = \sup\{k \geq 0 : E[A_f^k(t)] \leq \infty\}, \quad (1)$$

where $E[A_f^k(t)]$ represents the expected value of $A_f^k(t)$. When the tail coefficient comprises a value greater than 1, the flow 341 is an HT flow, otherwise the flow 341 is an LT flow. An HT flow commonly comprises a tail coefficient less than or equal to two.

The traffic classification unit 313 is further configured to compute a power factor, denoted as $\alpha_f$, for each flow 341 based on the tail coefficient computed in equation (1). The power factor $\alpha_f$ is subsequently employed by the switch coordination unit 312 for scheduling policy selection. As described above, in order to provide about equal services to both HT and LT traffic, a heavier or higher scheduling weight may be applied to a flow 341 carrying LT traffic than a flow 341 carrying HT traffic. For example, for an HT flow 341, the power factor $\alpha_f$ is computed by subtracting one from the tail coefficient $\kappa(A_f(t))$, whereas for LT traffic, the power factor $\alpha_f$ is set to a constant value, denoted as $c_f$, greater than 2. The computation of the power factor $\alpha_f$ is expressed as follows:

$$\alpha_f = \begin{cases} \kappa(A_f(t)) - 1, & f \in HT \\ c_f > 2, & f \in LT \end{cases}, \quad (2)$$

where $f \in HT$ represents the set of flows 341 classified as HT flows, and $f \in LT$ represents the set of flows 341 classified as LT flows.

In an embodiment, the traffic classification unit 313 employs discrete wavelet transform to transform the LRD arrival process of an HT flow 341 to an SRD arrival process as described in I. W. C. Lee, et al., "Estimating heavy-tails in long-range dependent wireless traffic." Institute of Electrical and Electronics Engineers (IEEE) vehicular technology conference (VTC), 2005 (Lee), which is incorporated herein by reference. Subsequently, the traffic classification unit 313 applies extreme value theory to the transformed SRD arrival process to compute the tail coefficient as described in A. Dekkers, et al., "A moment estimator for the index of an extreme value distribution," Annual statistics, No. 17, pp. 1833-1855, 1989 (Dekkers), which is incorporated herein by reference. As shown in Lee, the arrival process $A_f(t)$ of an HT flow such as the flow 341 may be represented as a random process X(t), where $\{X(t),$ t:0, ..., $2^J$} and J is a positive integer representing the number of samples in the process X(t). By applying discrete wavelet transform, the process X(t) may be represented as a sum of wavelets as shown below:

$$X(t)=\Sigma_{k=0}^{2^{J-j}-1}\Sigma_{j=0}^{J} d_X(j,k)\varphi_{j,k}(t,k), \quad (3)$$

where $d_X(j,k)$ represents the wavelet coefficients that define the process X(t), j represents an octave or a scale in a wavelet, k represents a time shift, and $\varphi_{j,k}(t,k)$ is a scaling function derived from a mother wavelet $\varphi(t)$. The scaling function $\varphi(t)$ is expressed as follows:

$$\varphi_{j,k}(t) = 2^{-\frac{j}{2}}\varphi(2^{-j}t - k). \quad (4)$$

The wavelet coefficients $d_X(j,k)$ are defined as follows:

$$d_X(j,k)=\int X(t)\varphi_{j,k}(t,k). \quad (5)$$

The wavelet coefficients $d_X(j,k)$ form an SRD process comprising the same tail coefficient as the LRD arrival process, and thus an extreme value theory may be applied to the wavelet coefficients $d_X(j,k)$ to determine the tail coefficient for the flow.

As shown in Dekkers, an SRD process, denoted as $\{X_i\}$, with data samples of $\{X_1 > X_1 > X_2 > \ldots X_n\}$, a tail coefficient $\hat{\kappa}_n$ may be computed as follows:

$$\hat{\kappa}_n = H_{k,n}^{(1)} + 1 - \frac{0.5}{1 - (H_{k,n}^{(1)})^2 / H_{k,n}^{(2)}}, \quad (6)$$

where $$H_{k,n}^{(r)} = \frac{1}{k}\sum_{1 \leq i \leq k}\left[\log\left(\frac{X_{(i)}}{X_{(k+1)}}\right)\right]^r$$

and $1 \leq k < n$. Thus, equation (6) may be applied to the wavelet coefficients shown in equation (5) to estimate the tail coefficient of the flow. In some embodiments, the estimation of the tail coefficients as described in equations (3)-(6) may be implemented in software executed on a high-performance processor such as a DSP. In some other embodiments, the estimation of the tail coefficients may be implemented by on-chip hardware. The high-performance processor or on-chip hardware may enable classification and scheduling to be performed in real time.

The switch coordination unit 312 may be a software component and/or hardware configured to estimate HoL delays for the queues 314 or the flows 341, denoted as $W_f(t)$, and select an optimal scheduling policy by maximizing the sum of HoL delays $W_f(t)$ up to $\alpha_f$ order as follows:

$$S(t) \in \arg\max_{(S_f) \in S}\{\Sigma_{f \in F} W_f^{\alpha_f}(t)S_f\}, \quad (7)$$

where S represents a set of scheduling policies over a finite time interval $t \in Z_+$ and $S_f$ represents a schedule for a particular flow 341. When $S_f$ is set to a value of one, the flow 341 is scheduled to transmit in the time interval. When $S_f$ is set to a value of zero, the flow 341 is not scheduled to transmit in the time interval. As can be seen in equation (7), the power-weight delay $W_f^{\alpha_f}(t)$ sets the serving priority of a flow 341 and the optimal scheduling policy, S(t), is selected to serve the flow 341 with the maximum power-weight delay $W_f^{\alpha_f}(t)$. The selection of the scheduling policy for forwarding the flows 341 is shown by the switch 315, which is driven by the switch coordination unit 312. In some embodiments, the scheduling weights may be further dependent on the number of the flows 341 that are classified as HT flows and the number of the flows 341 that are classified as LT flows in the network 300. In addition, scheduling weights may further incorporate the arrival patterns of flows 341 and any other statistical information associated with the flows 341.

The routing unit 311 may be a software component and/or hardware configured to determine an optimal route for routing each flow 341. The edge node 310 is further configured to send the traffic information such as the classification and the power factors $\alpha_f$ to the interior node 320 as shown by the arrow 351.

The interior node 320 employs the same DMPWS mechanisms as the edge node 310. In the interior node 320, the queues 324 may be configured in a similar configuration as the queues 314. As an example, the edge node 310 forwards all the flows 341 to the interior node 320 as shown by the arrow 352, and each queue 324 is employed to hold packets received from one of the flows 341. The switch coordination unit 323 is similar to the switch coordination unit 312 and employs the same power factor $\alpha_f$ as the edge node 310 for the same flow 341. The power factor $\alpha_f$ may be transmitted from the edge node 310 to the interior node 320, thus the computationally complex operations of the tail coefficient estimations are computed only at the edge node 310. Similar to the edge node 310, the switch coordination unit 323 drives the switch 325 to determine a schedule for forwarding the packets in the queues 324. It should be noted that although the transmission of the traffic classification information and the flow statistics is shown as a separate transmission from the flows 341, the traffic classification information and the flow statistics may be distributed to the interior node 320 via any suitable mechanisms such as in-band or out-of-band mechanisms. In addition, the edge node 310 may forward one or more flows 341 to the interior node 320 and one or more flows 341 to another interior node similar to the interior node 320 depending on the routing unit 311.

The routing unit 322 is similar to the routing unit 311. The edge node 310 and the interior node 320 may further comprise other units, such as application units configured to support any type of applications. The network 300 may comprise other interior nodes similar to the interior node 320 along the forwarding paths of the flows 341 and configured to employ the same scheduling and queuing mechanisms and power factors $\alpha_f$ as the edge node 310 and the interior node 320 for scheduling the flows 341. Thus. E2E network capacity may be maximized and E2E network delay may be minimized.

Figure 4:
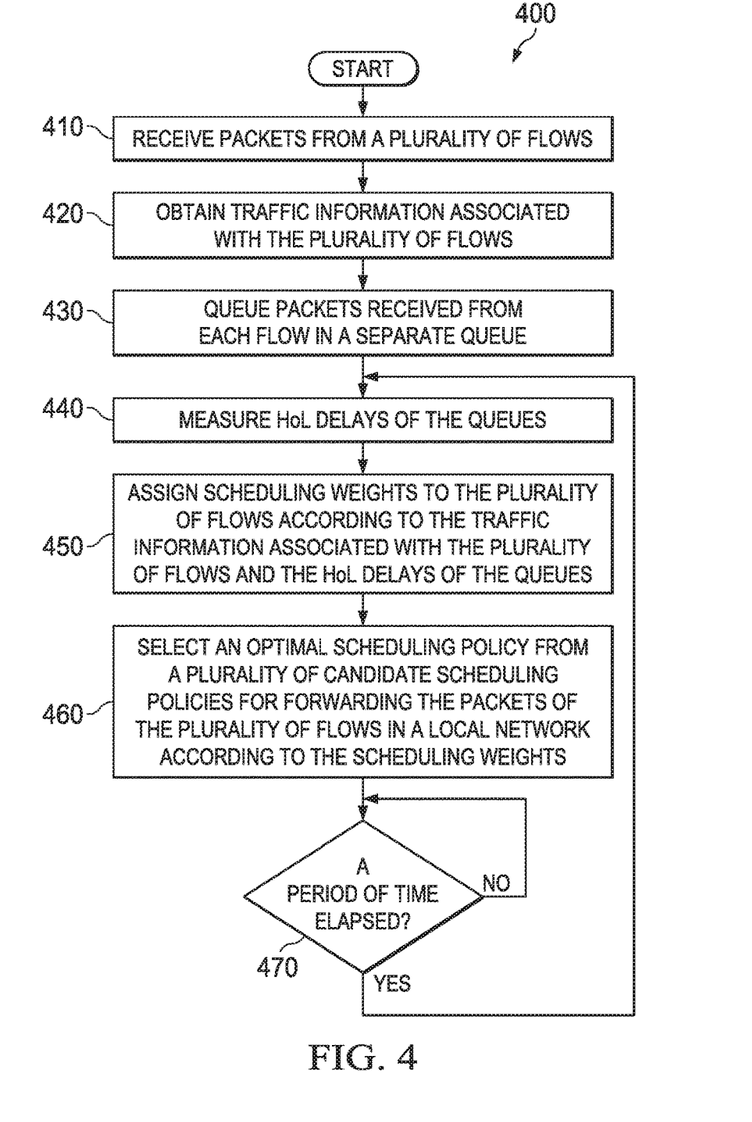
FIG. 4 is a flowchart of an embodiment of a method for performing DMPWS.

FIG. 4 is a flowchart of an embodiment of a method 400 for performing DMPWS. The method 400 is implemented by an NE, such as the edge nodes 110 and 310, the interior nodes 120 and 320, and the NE 200. The method 400 is implemented when determining a transmission schedule. The method 400 employs similar scheduling mechanisms as described in the networks 100 and 300. At step 410, packets from a plurality of flows are received by the NE. At step 420, traffic information associated with the plurality of flows is obtained. The traffic information comprises classification of the plurality of flows, where the classification comprises an HT traffic class and an LT traffic class. For example, a flow is categorized into an HT traffic class when packet inter-arrival times of the flow comprise an HT distribution. Conversely, a flow is categorized into an LT traffic class when packet inter-arrival times of the flow comprise an LT distribution. At step 430, packets from each flow are queued in a separate queue. Thus, there is a one-to-one mapping between the flows and the queues. At step 440, HoL delays of the queues are measured. The HoL delay of a queue corresponds to a time duration between an arrival time and a transmission time of a packet in the queue. At step 450, scheduling weights are assigned to the plurality of flows according to the traffic information associated with the plurality of queues and the HoL delays of the queues. The scheduling weights are power-weight delays, each comprising a value of a corresponding queue HoL delay raised to an order of a corresponding power factor. The power factor is set according to equation (2) described above. At step 460, an optimal scheduling policy is selected from a plurality of candidate scheduling policies for forwarding the packets of the plurality of flows in the local network according to the scheduling weights. The optimal scheduling policy is selected according to equation (7) described above. At step 470, a determination is made whether a period of time has elapsed. For example, the period of time may be about 5 transmission slots to about 100 transmission slots. If the period of time has elapsed, the method 400 returns to step 440 to repeat the steps of 440 to 460, otherwise the method 400 repeats step 470. It should be noted that incoming packets received during the period of wait time may be forwarded according to the scheduling policy selected at step 460.

Figure 5:
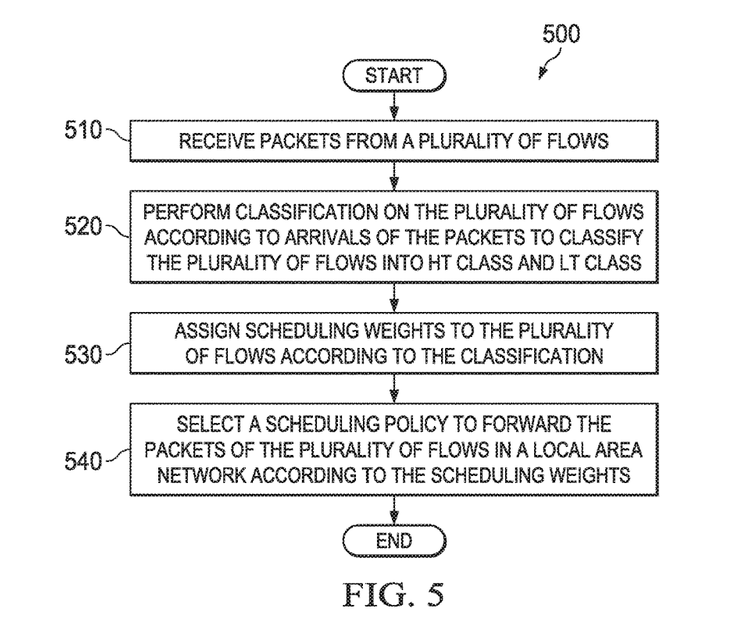
FIG. 5 is a flowchart of another embodiment of a method for performing DMPWS.

FIG. 5 is a flowchart of another embodiment of a method 500 for performing DMPWS. The method 500 is implemented by an NE, such as the edge nodes 110 and 310, the interior nodes 120 and 320, and the NE 200. The method 500 is implemented when determining a transmission schedule. The method 500 employs similar scheduling mechanisms as described in the networks 100 and 300 and the method 400. At step 510, packets are received from a plurality of flows. For example, the plurality of flows is received from an external network. At step 520, classification is performed on the plurality of flows according to arrivals of the packets to classify the plurality of flows into HT class and LT class. At step 530, scheduling weights are assigned to the plurality of flows according to the classification. At step 540, a scheduling policy is selected to forward the packets of the plurality of flows in a local network according to the scheduling weights.

Figure 6:
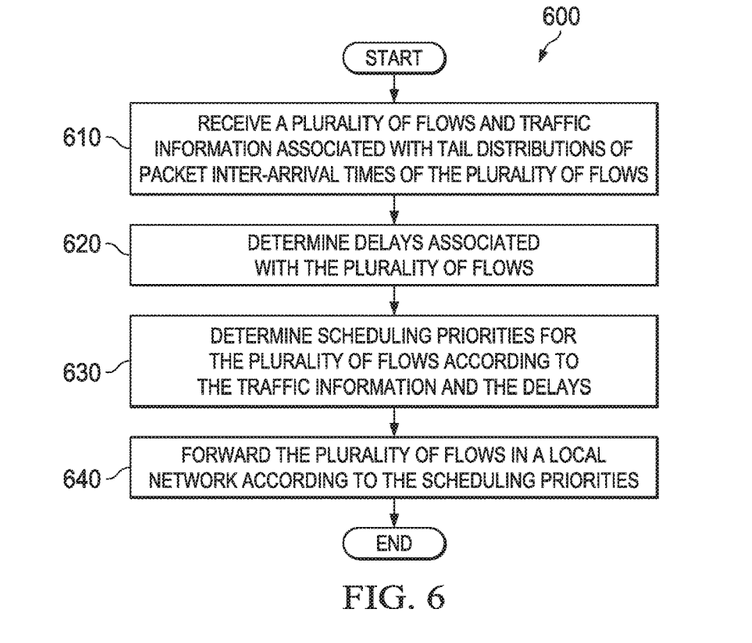
FIG. 6 is a flowchart of another embodiment of a method for performing DMPWS.

FIG. 6 is a flowchart of another embodiment of a method 600 for performing DMPWS. The method 600 is implemented by an NE, such as the edge nodes 110 and 310, the interior nodes 120 and 320, and the NE 200. The method 600 is implemented when determining a transmission schedule. The method 600 employs similar scheduling mechanisms as described in the networks 100 and 300 and the methods 400 and 500. At step 610, a plurality of flows and traffic information associated with tail distributions of packet inter-arrival times of the plurality of flows are received. At step 620, delays associated with the plurality of flows are determined. For example, the packets may be queued at packet queues by flows and the delays may be HoL delays of corresponding queues. At step 630, scheduling priorities are determined for the plurality of flows according to the traffic information and the delays. At step 640, the plurality of flows is forwarded in a local network according to the scheduling priorities.

In an embodiment, to simplify design and reduce computational load in the local network, the classification of the flows and the power factor computation are performed only at the edge nodes of the local network. The classification and/or the power factors may be distributed to the interior nodes of the local network so that all the interior nodes of the local network may select an optimal scheduling policy based on local HoL delays and the same power factors. By employing the same scheduling mechanisms throughout the local network, optimal throughput and minimal latency or packet delays may be achieved E2E in the local network. The steps of 440-460 may be repeated at some time intervals to update measurements of HoL delays and re-select a scheduling policy for the reduction of signaling overheads.

FIGS. 7-11 illustrate the performance of the DMPWS scheme described in the networks 100 and 300 and the method 400 in a hybrid HT/LT network. A single DMPWS-based scheduler is used to schedule two HT flows and three LT flows according to equation (7) and setting the power factor $\alpha_f$ to a value of 0.5 for the HT flows and a value of 2 for the LT flows. Each HT flow is generated as a sequence of random variable X comprising a Pareto distribution with a parameter $x_m$ of 1.5 and a parameter $\alpha$ of 1, where the probability of X is $$P(X > x) = \left(\frac{x_m}{x}\right)^\alpha.$$

Each LT flow is generated as a sequence of random variable X comprising a Poisson distribution with a parameter $\lambda$ of 3, where the probability of X is $P(X>x)=1-e^{-\lambda}\sum_{i=0}^{floor(x)}\lambda^i/i!$, where i! represents an i factorial.

Figure 7:
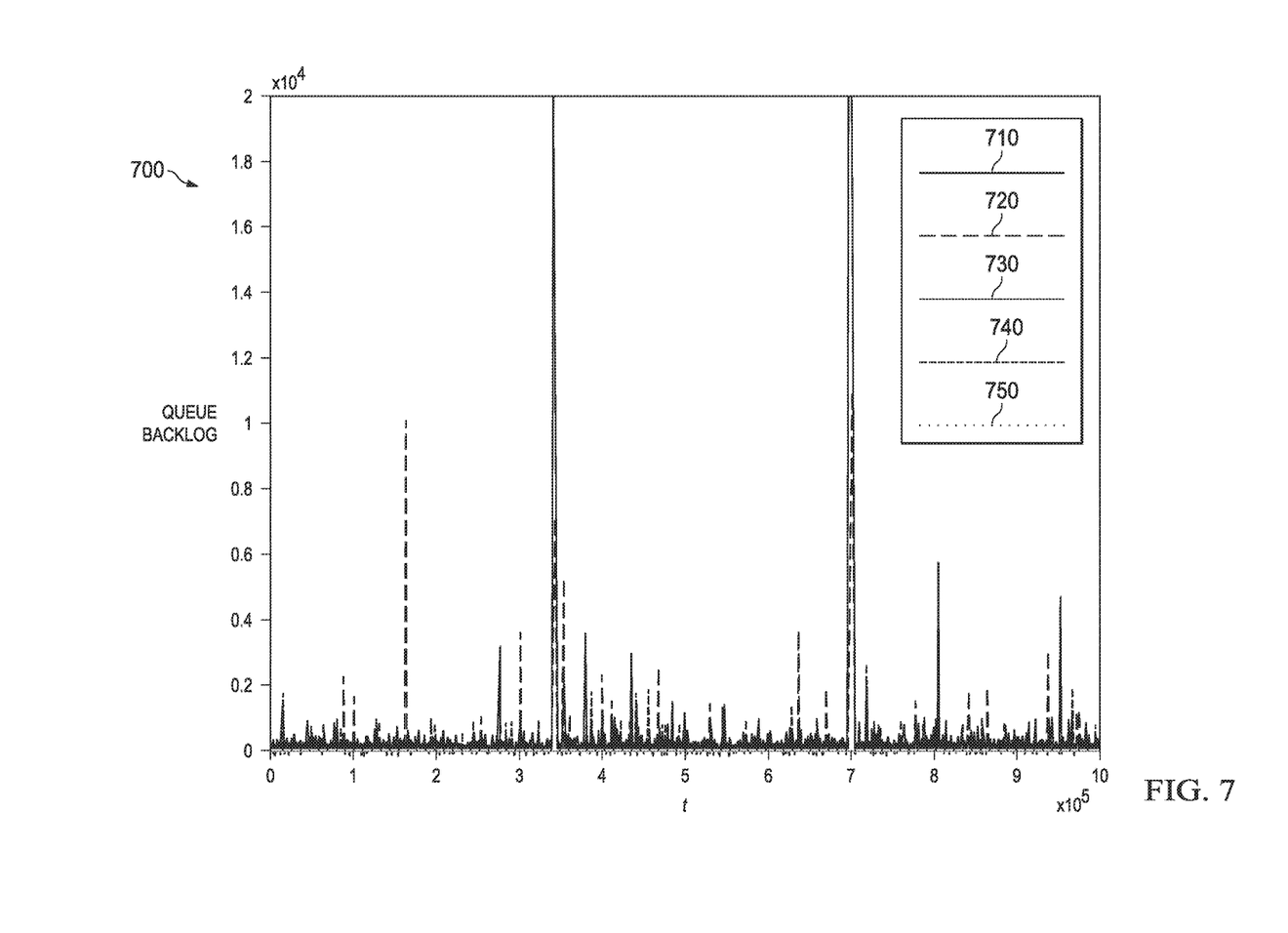
FIG. 7 is a graph illustrating queue backlogs of HT flows and LT flows in a hybrid heavy-tailed/light-tailed (HT/LT) network under DMPWS.

FIG. 7 is a graph 700 illustrating queue backlogs of the HT flows and the LT flows in the hybrid HT/LT network under DMPWS. The x-axis represents time in some constant units. The y-axis represents queue backlogs or the number of packets waiting for transmission in a queue. The heavy solid line 710 shows queue backlogs for a first of the HT flows. The heavy dashed line 720 shows the queue backlogs for a second of the HT flows. The light solid line 730 shows the queue backlog for a first of the LT flows. The light dashed line 740 shows the queue backlog for a second of the LT flows. The light dotted line 750 shows the queue backlog for a third of the LT flows. As shown, there is no large queue backlog for the LT flows. Thus, the DMPWS-based scheduler is effective in providing services to LT flows under a hybrid HT/LT network.

Figure 8:
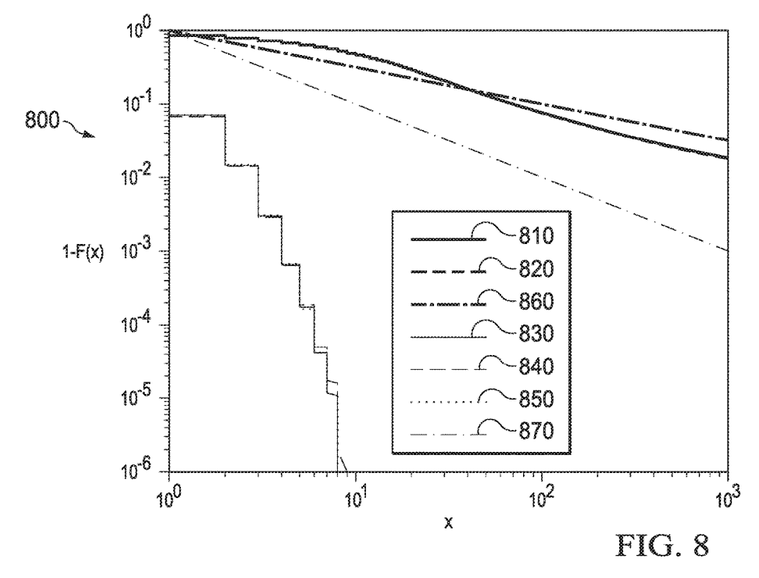
FIG. 8 is a graph illustrating tail distributions of queue backlogs of HT flows and LT flows in a hybrid HT/LT network under DPMWS.

FIG. 8 is a graph 800 illustrating tail distributions of queue backlogs of the HT flows and the LT flows in the hybrid HT/LT network under DPMWS. The x-axis represents queue backlogs. The y-axis represents the complementary cumulative distribution of the queue backlogs. The complementary cumulative distribution is defined as $1-F(x)$, where $F(x)$ is the cumulative distribution of x. The heavy solid curve 810 and the heavy dashed curve 820 show the complementary cumulative distributions of queue backlogs for the HT flows. The light solid curve 830, the light dashed curve 840, and the light dotted curve 850 show the complementary cumulative distributions of queue backlogs for the LT flows. For comparison purpose, distribution curves with tail indexes of 0.5 and 1.0 are shown as a heavy dashed-dotted curve 860 and a light dashed-dotted curve 870, respectively. As shown, the curves 830-850 for the LT flows comprise slopes greater than 1, indicating that queue backlogs for the LT flows comprise a finite mean.

Figure 9:
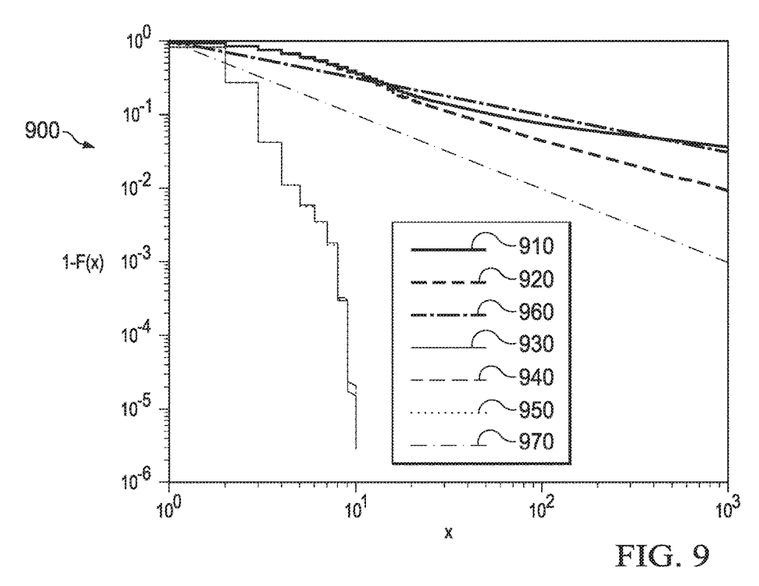
FIG. 9 is a graph illustrating tail distributions of packet delays of HT flows and LT flows in a hybrid HT/LT network under DPMWS.

FIG. 9 is a graph 900 illustrating tail distributions of packet delays of the HT flows and LT flows in the hybrid HT/LT network under DPMWS. The x-axis represents packet delays. The y-axis represents the complementary cumulative distribution of the packet delays. The heavy solid curve 910 and the heavy dashed curve 920 show the complementary cumulative distributions of packet delays for the HT flows. The light solid curve 930, the light dashed curve 940, and the light dotted curve 950 show the complementary cumulative distributions of packet delays for the LT flows. For comparison purpose, distribution curves with tail indexes of 0.5 and 1.0 are shown as a heavy dashed-dotted curve 960 and a light dashed-dotted curve 970, respectively. As shown, the curves 930-750 for the LT flows comprise slopes greater than 1, indicating that packet delays for the LT flows comprise a finite mean. When the packet delays and the queue backlogs for the LT flows comprise finite means, the hybrid HT/LT network is stable.

Figure 10:
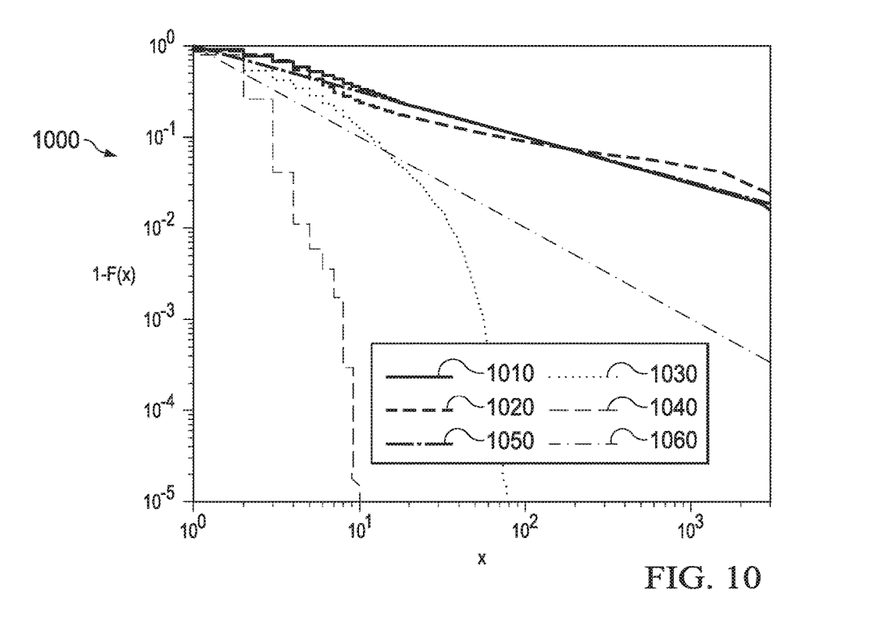
FIG. 10 is a graph comparing the performance of DMPWS to other types of MWS schemes for LT flows in a hybrid HT/LT network.

FIG. 10 is a graph 1000 comparing the performance of DMPWS to other types of MWS schemes for the LT flows in the hybrid HT/LT network. The x-axis represents packet delays in constant units of time. The y-axis represents complementary cumulative distribution of the packet delays. The solid curve 1010 shows the complementary cumulative distributions of packet delays for the LT flows when employing a queue backlog-based MWS (QMWS) scheduler, where scheduling weights are the queue lengths. The long dashed curve 1020 shows the complementary cumulative distributions of packet delays for the LT flows when employing a delay-based MWS (DMWS) scheduler, where scheduling weights are the HoL delays. The dotted curve 1030 shows the complementary cumulative distributions of packet delays for the LT flows when employing a queue backlog-power-based MWS (QMPWS) scheduler, where scheduling weights are the queue lengths to an $\alpha_f$ order. The short dashed curve 1040 shows the complementary cumulative distributions of packet delays for the LT flows when employing a DMPWS scheduler. $\alpha_f$ is set to a value of 0.5 for the HT flows and a value of 1 for the LT flows for both the QMPWS scheduler and the DMPWS scheduler. For comparison purpose, distribution curves with tail indexes of 0.5 and 1.0 are shown as a heavy dashed-dotted curve 1050 and a light dashed-dotted curve 1060, respectively. As shown, MWS and QWS schedulers bring HT distribution to the LT flows, and QMPWS and DMPWS schedulers support bounded delay for the LT flows. However, the DMPWS scheduler provides significantly lower packet delays than the QMPWS scheduler as shown by smaller tail index.

Figure 11:
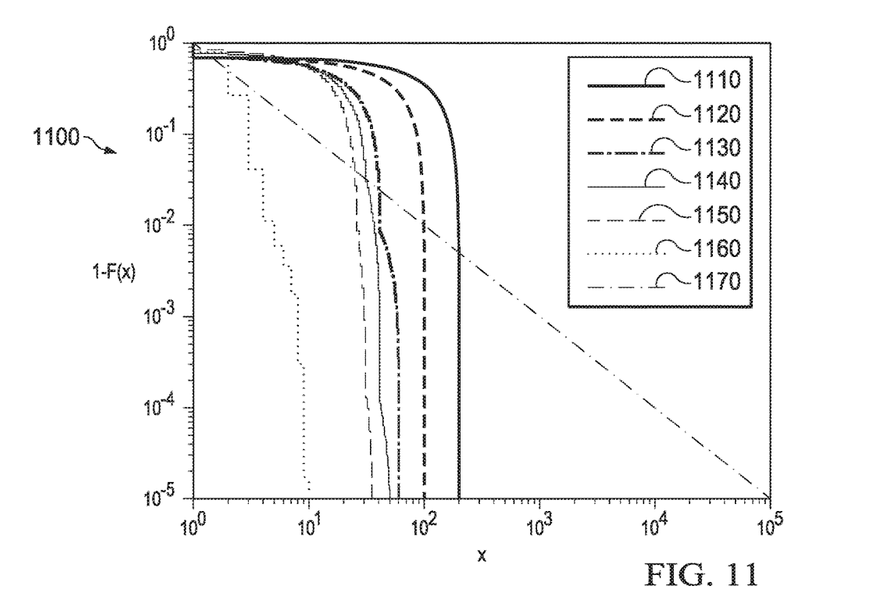
FIG. 11 is a graph illustrating tail distributions of packet delays of LT flows in a hybrid HT/LT network under DMPWS with various measurement update frequencies.

FIG. 11 is a graph 1100 illustrating tail distributions of packet delays of the LT flows in the hybrid HT/LT network under DMPWS with different measurement update frequencies. The x-axis represents packet delays in constant units of time. The y-axis represents complementary cumulative distribution of the packet delays. The heavy solid curve 1110, the heavy long dashed curve 1120, the heavy short dashed curve 1130, the heavy dotted curve 1140, the heavy dashed-dotted curve 1150, and light dashed curve 1160 show the complementary cumulative distributions of packet delays for the LT flows when the HoL delays are measured and the scheduler is updated at every 100, 50, 20, 10, 5, and 1 transmission time slots, respectively. For comparison purpose, a distribution curve with a tail index of 1.0 is shown as a light dashed-dotted curve 1170. As shown, the packet delays increase with decreasing measurement update frequencies, but the means are still bounded and finite, where the slopes of the curves 1110-1160 are all greater than 1. Thus, in order to reduce signaling overheads, the DMPWS scheduler may reduce the frequencies of HoL delay measurements and schedule selection updates.

The following table summarizes the differences between the disclosed DMPWS scheme and the commonly employed MWDS scheme.

TABLE 1

Comparisons Between MWS and DMPWS

| | MWS | DMPWS |
|---|---|---|
| Traffic Type | Only consider LT traffic | Scheduling weights account for both LT traffic and HT traffic |
| Design Metric | Queue lengths | HoL delays and traffic classification information |
| System Throughput | 100% throughput for an LT only network | 100% throughput for a hybrid HT/LT network |
| E2E Delay | Large delay | Significantly lower delay than MWS |
| Signaling Overheads | Constant exchange of queue length information | Adjustable updating frequency |

As shown in Table 1. DMPWS selects an optimal scheduling policy by accounting for both HT and LT traffic instead of LT traffic only as in MWS. Thus. DMPWS may achieve 100 percent (%) throughput under both HT and LT traffic in a hybrid HT/LT network, whereas MWS may achieve 100% throughput under LT traffic only network. In addition, DMPWS employs HoL delays and traffic classification information as scheduling metric instead of queue lengths as in MWS. The slow varying properties of traffic classification information enable DMPWS to update HoL delay measurements and scheduling policy at a slow adjustable rate. Thus, the signaling overheads of DMPWS are adjustable and may be significantly lower than MWS.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network element (NE) comprising:
 a receiver configured to receive packets from a plurality of flows; and
 a processor coupled to the receiver and configured to:
  perform classification on the plurality of flows according to packet inter-arrival times of the packets to classify the plurality of flows into a heavy-tailed (HT) class and a light-tailed (LT) class, wherein the packet inter-arrival times are based on a time duration between arrival times of two consecutive packets at the NE;
  assign scheduling weights to the plurality of flows according to the classification and by determining a head-of-line (HoL) delay for a first of a plurality of queues corresponding to a first flow of the plurality of flows, the HoL delay being a time duration between an arrival time and a transmission time of a first of the packets in the first queue; and
  select a scheduling policy to forward the packets of the plurality of flows according to the scheduling weights.

2. The NE of claim 1, further comprising a memory coupled to the receiver and the processor, wherein the memory is configured to store the plurality of queues, wherein each queue is configured to hold packets of a particular flow, and wherein the processor is further configured to assign the scheduling weights to the plurality of flows by:
 determining a power factor for the first flow according to the classification; and
 setting a first of the scheduling weights of the first flow to a value of the HoL delay raised to an order of the power factor.

3. The NE of claim 2, wherein the processor is further configured to perform the classification on the plurality of flows by:
 determining a tail distribution coefficient for the first flow according to the packet inter-arrival times of the first flow; and
 classifying the first flow into the HT class and the LT class according to the tail distribution coefficient.

4. The NE of claim 3, wherein the processor is further configured to determine the power factor for the first flow by:
 setting the power factor to a value of one less than the tail distribution coefficient when the flow is in the HT class; and
 setting the power factor to a constant value greater than two when the flow is in the LT class.

5. The NE of claim 3, wherein the processor is further configured to determine the tail distribution coefficient for the first flow by:
 performing a discrete wavelet transform on the packet inter-arrival times of the first flow to produce discrete wavelet coefficients; and
 applying an extreme value theory to the discrete wavelet coefficients to produce the tail distribution coefficient.

6. The NE of claim 1, wherein the processor is further configured to select the scheduling policy from a plurality of candidate scheduling policies to serve a first of the flows comprising a maximum scheduling weight.

7. The NE of claim 1, wherein the processor is further configured to collect flow statistics for the plurality of flows.

8. The NE of claim 1, wherein the NE is an edge node of a local network, wherein the plurality of flows is received from a remote network, wherein the NE further comprises a transmitter coupled to the processor and configured to send traffic information associated with the plurality of flows to a local NE of the local network, and wherein the traffic information comprises the classification of the plurality of flows.

9. A method implemented by a network element (NE) in a local network, comprising:
 receiving, via a receiver of the NE, packets from a plurality of flows;
 obtaining traffic information associated with the plurality of flows, wherein the traffic information comprises classification of the plurality of flows according to packet inter-arrival times of the packets, wherein the packet inter-arrival times are based on a time duration between arrival times of two consecutive packets at the NE, and wherein the classification comprises a heavy-tailed (HT) traffic class and a light-tailed (LT) traffic class;
 queueing the packets received from each flow in a separate queue;
 measuring head-of-line (HoL) delays of the queues;
 assigning, via a processor of the NE, scheduling weights to the plurality of flows according to the traffic information and by setting the scheduling weight of each flow to a value of a corresponding queue HoL delay raised to an order of a corresponding power factor; and
 selecting, via the processor, a scheduling policy from a plurality of candidate scheduling policies for forwarding the packets of the plurality of flows according to the scheduling weights.

10. The method of claim 9, wherein the traffic information further comprises power factors for scheduling the plurality of flows, wherein the power factors are dependent on the classification.

11. The method of claim 10, wherein assigning the scheduling weights according to the traffic information to the plurality of flows is based on the plurality of candidate scheduling policies, and wherein the selection of the scheduling policy comprises comparing a sum of the scheduling weights.

12. The method of claim 10, wherein the scheduling policy is selected for a current transmission time slot, and wherein the method further comprises:
 employing the scheduling policy for a period of time subsequent to the current transmission time slot, wherein the period of time is a range between 5 transmission time slots to 100 transmission time slots; and
 repeating the measuring of the HoL delays and the selecting of the scheduling policy at an end of the period of time.

13. The method of claim 10, wherein obtaining the traffic information comprises generating, via the processor, the power factors for the plurality of flows, wherein the plurality of flows include a flow of the HT traffic class and a flow of the LT traffic class and wherein a power factor of the flow of the HT traffic class is greater than a power factor of the flow of the LT traffic class.

14. The method of claim 13, further comprising computing, via the processor, a tail distribution coefficient for an arrival process by:
 performing a discrete wavelet transform on the arrival process to produce discrete wavelet coefficients; and
 applying an extreme value theory to the discrete wavelet coefficients to estimate the tail distribution coefficient.

15. The method of claim 9, wherein the plurality of flows are received from a remote network, and wherein the method further comprises sending, via a transmitter of the NE, the traffic information to a local NE of the local network.

16. The method claim 9, wherein obtaining the traffic information comprises receiving, via the receiver, the traffic information from a local NE of the local network.

17. A network element (NE) comprising:
- a receiver configured to receive a plurality of flows and traffic information associated with tail distributions of packet inter-arrival times of the plurality of flows, wherein the packet inter-arrival times are based on a time duration between arrival times of two consecutive packets at the NE;
- a memory coupled to the receiver, the memory configured to store a plurality of queues, each configured to hold packets of a particular flow;
- a processor coupled to the receiver and the memory, the processor configured to:
  - determine delays associated with the plurality of flows by measuring head-of-line (HoL) delays of corresponding queues; and
  - determine scheduling priorities for the plurality of flows according to the traffic information and the delays; and
- a transmitter coupled to the processor and configured to forward the plurality of flows according to the scheduling priorities.

18. The NE of claim 17, wherein the traffic information comprises scheduling power factors for the plurality of flows, wherein scheduling power factors of flows of light-tailed (LT) distributions are greater than scheduling power factors of flows with heavy-tailed (HT) distributions, and wherein the processor is further configured to determine the scheduling priorities by setting the scheduling priority of each flow to a value of a corresponding queue HoL delay raised to an order of a corresponding power factor.

19. The NE of claim 18, wherein the processor is further configured to select a scheduling policy from a plurality of candidate scheduling policies to schedule a first of the flows comprising a highest scheduling priority.

* * * * *